Patented Aug. 1, 1950

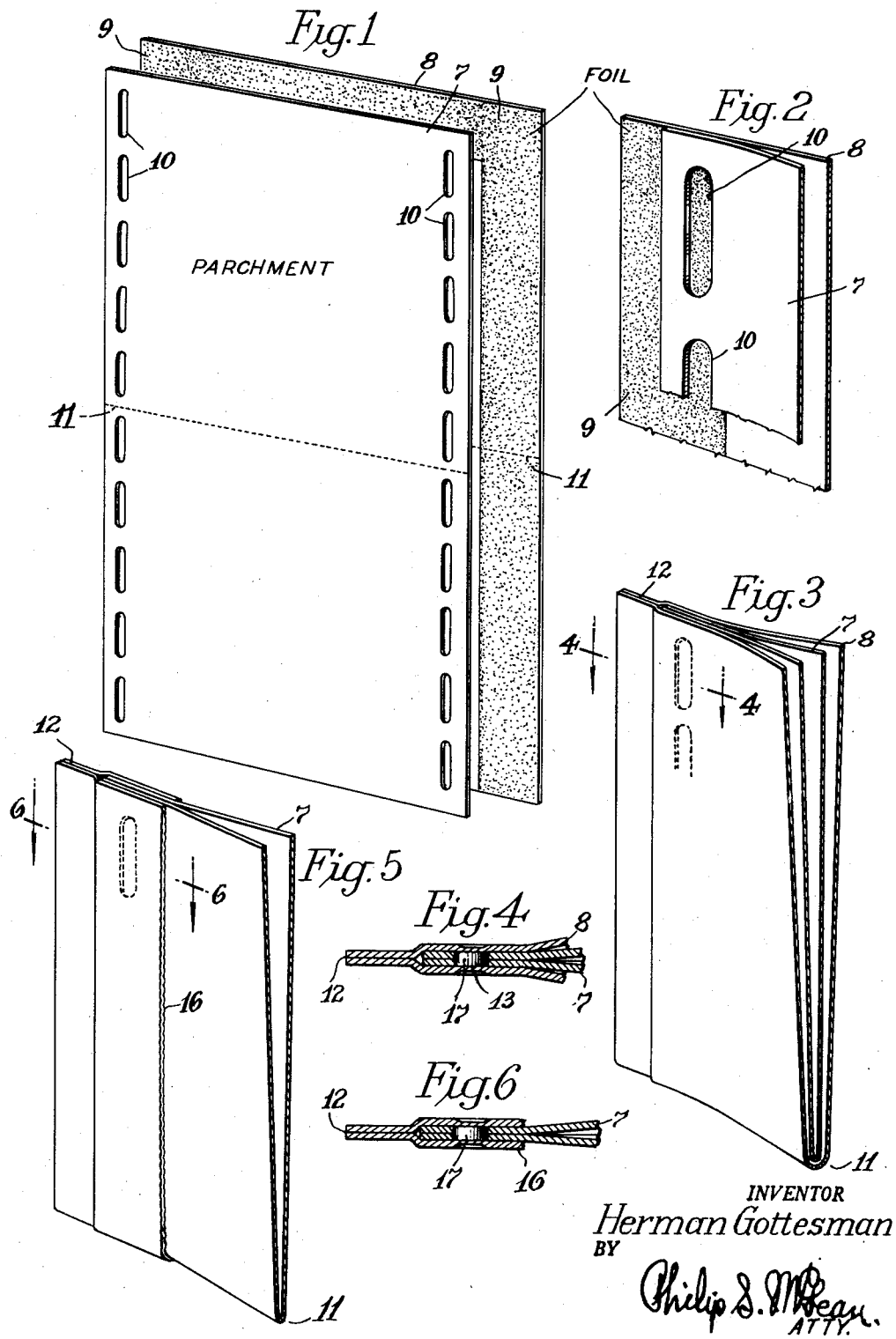

2,516,978

UNITED STATES PATENT OFFICE 2,516,978

FREEZING AND COOKING BAG

Herman Gottesman, Ramsey, N. J.

Application September 27, 1946, Serial No. 699,620

1 Claim. (Cl. 229—55)

The invention disclosed in this patent relates to bags or containers for vegetables and edible products generally.

Objects of the invention are to provide a bag for deep freezing food products, which may be subsequently used for heating or cooking the contents without disturbing or rehandling the products.

Further special objects of the invention are to provide a bag structure of the double use character indicated, which while durable, strong and otherwise practical for the purposes, will be of simple, inexpensive construction.

Special objects also are to provide a bag of the dual character indicated, which will be quickly and easily convertible from the initial status as a freezing container to the subsequent or secondary use as a cooking container.

Other desirable objects and the novel features through which the purposes of the invention are attained are set forth or will appear in the course of the following specification.

The drawing accompanying and forming part of the specification illustrates a present practical embodiment of the invention. Actual physical structure, however, may be modified and changed as regards the immediate disclosure, all within the true intent and broad scope of the invention as hereinafter defined and claimed.

Fig. 1 in the drawing is a perspective view illustrating the two layers of material of which the bag is formed.

Fig. 2 is an enlarged broken sectional detail illustrating the superposition of the inner, porous or parchment layer over the outer, impervious or metal foil layer.

Fig. 3 is a perspective and broken sectional view showing the two layers as folded at the center and brought together into sealed relation along the edges.

Fig. 4 is a broken sectional detail as on the line 4—4 of Fig. 3 showing the layers sealed together along the edges and the outer layer free and ready for easy detachment inward of the sealed edges.

Fig. 5 is a perspective sectional view showing the bag with the outer impervious layer removed to leave the inner porous layer exposed as for heating or cooking the bag contents.

Fig. 6 is a broken sectional view as on the plane of line 6—6 of Fig. 5.

In Fig. 1 the inner, porous or pervious layer of the bag or container is represented at 7 and the outer impervious or airtight layer at 8.

The inner sheet or layer 7 which may be of vegetable parchment is pervious to moisture vapors while the outer layer which may be of aluminum or other metal foil is airtight and moisture vapor transmission proof.

The outer airtight and waterproof layer 8 is wider than the inner layer and those portions of the edges which overlap the edges of the inner layer are coated or treated with heat sealing medium as represented by the underlying strips 9.

To interlock and more firmly secure the sheets, the overlying edge portions of the inner layer may be perforated or slotted, as indicated at 10, so that when the parts are assembled as will be described, portions of the heat sealing medium may extend from the edge sealing strips 9 completely through the encompassed inner layers.

Assemblage of the parts involves overlaying the back or outer layer 8 with the inner narrower layer 7, doubling the layers together along the fold line 11 and then heat sealing the overlaid opposed portions of the edge strips 9 together after the manner indicated at 12 in Figs. 3, 4, 5 and 6. In this operation those portions of the outside, backing layer which are wider than the inner layer come together directly over the edges of the doubled inner layer, as shown particularly in Figs. 4 and 6, and portions of the heat sealing strips inward of such edges adhere to the underlying edge portions of the inner layer and come together through the slots 10 in the latter as integral fused "rivets" or studs 13. As a consequence, the inner layer or lining 7 is entirely sealed and secured within the impervious outer layer or cover, but intermediate portions of the cover layer inward of the sealing strips 9 are left free and unattached to the inner layer substantially as indicated in Figs. 3 and 4.

This provides a rugged double thickness bag structure capable of undergoing deep freezing, storage handling and other operations. The mouth of this bag may be sealed in any suitable manner, for example, by means of a sealing strip doubled and fused in place over the open end of the bag.

As an alternative the outer, backing layer 8 may be extended at the ends beyond the ends of the inner layer and have fusible heat sealing strips to be heat sealed across the mouth of the bag after the bag has been filled ready for deep freezing or other handling. The outer or backing layer thus may be larger and extend beyond all or any number of edges of the inner layer to form seals completely or partly about the edges of the inner, bag forming layer.

When the bag is to be used for heating or cooking purposes the outer, foil or imperforate covering may be detached as by tearing it away along the edges 16 of the side sealing strips, substantially as shown in Figs. 5 and 6, leaving only the parchment or porous bag walls 7 suited for cooking or such purposes and this without removing, handling or disturbing the frozen contents in any way.

What is claimed is:

A bag which can be used for freezing and for subsequently cooking bag contents and comprising an outer impervious layer of metal foil and an inner layer of pervious paper, the outer layer being of greater width than the inner layer and superposed over the inner layer with opposite side edges of the same projecting beyond the side edges of the inner layer and the two layers folded on a transverse line bringing projecting edge portions of the outer layer directly together over and about the edges of the inner layer, the edge portions of the inner layer having perforations therein, said projecting edge portions of the outer layer being heat sealing in character and being heat sealed together about the edges of said inner layer and through said perforations in the edge portions of said inner layer but with the intermediate portion of the outer layer inwardly of the perforations unattached and free to be torn away to leave the pervious inner layer uncovered for cooking purposes but held together about the edges by the heat sealed edge portions of the outer layer remaining after detachment of said intermediate portion.

HERMAN GOTTESMAN.

REFERENCES CITED

The following references are of record in the file of this patent:

UNITED STATES PATENTS

| Number | Name | Date |
|---|---|---|
| 1,137,281 | Peterson | Apr. 27, 1915 |
| 1,880,277 | Pinkerton, Jr. | Oct. 4, 1932 |
| 2,162,258 | Hultin | June 13, 1939 |
| 2,248,579 | Moore | July 8, 1941 |
| 2,350,132 | Rohdin | May 30, 1944 |
| 2,373,285 | Baer | Apr. 10, 1945 |